United States Patent
Shah

(10) Patent No.: US 12,192,178 B2
(45) Date of Patent: Jan. 7, 2025

(54) SYSTEMS AND METHODS FOR PORTABLE COMPUTING DEVICE PROTECTION

(71) Applicant: Fortinet, Inc., Sunnyvale, CA (US)

(72) Inventor: Kushal Arvind Shah, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/190,361

(22) Filed: Mar. 2, 2021

(65) Prior Publication Data

US 2022/0286436 A1 Sep. 8, 2022

(51) Int. Cl.
*H04L 9/40* (2022.01)
*H04L 67/141* (2022.01)
*H04L 67/56* (2022.01)

(52) U.S. Cl.
CPC ...... *H04L 63/0281* (2013.01); *H04L 63/1408* (2013.01); *H04L 67/141* (2013.01); *H04L 67/56* (2022.05)

(58) Field of Classification Search
CPC ............ H04L 63/0281; H04L 63/1408; H04L 67/141; H04L 67/56
See application file for complete search history.

(56) References Cited

U.S. PATENT DOCUMENTS

2014/0137240 A1\* 5/2014 Smith ................. H04L 63/1441 726/22
2016/0309481 A1\* 10/2016 Verma ............... H04W 28/0231

\* cited by examiner

*Primary Examiner* — Gil H. Lee
(74) *Attorney, Agent, or Firm* — Jaffery Watson Hamilton & DeSanctis

(57) ABSTRACT

Various approaches for providing intermediary threat detection. In some cases, the intermediary threat detection is performed by a communication control port that operatively couples with a portable computing device to protect the portable computing device from network based vulnerabilities and exploits.

13 Claims, 4 Drawing Sheets

SYSTEMS AND METHODS FOR PORTABLE COMPUTING DEVICE PROTECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to network security and communication. In some cases, embodiments discussed relate to a communication control port that operatively couples with a portable computing device to protect the portable computing device from network based vulnerabilities and exploits.

BACKGROUND

In the current era, there has been a rampant increase in the use of portable computing devices such as smart phones, tablet computers, and internet of things (IoT) devices. Most of these devices include interfaces through which they are freely available to malicious entities, which can detect vulnerabilities present on their communication interfaces. Network based exploits occur in the devices due to vulnerable communication components (e.g. Bluetooth radios, Wireless radios, built-in software, etc) provided by the manufacturers. These vulnerable components become target of the malicious entities, which can then affect millions of devices. There have been a number of zero-day attacks such as for example, BlueBorne Attack, KRACK attacks, iOS 10.2 wi-fi exploit, etc, where a malicious entity or an attacker has leveraged the attack based on vulnerable communication components implemented in the computing devices.

Traditional security solutions generally implement software services to check for malicious content within the computing device and ensure safe surrounding environment by analyzing previously secured wireless access points. Existing security solutions, however, do not secure the devices against potential malicious surrounding entities (such as non-secure Wifi Access Points, Bluetooth radio connections, etc.) which when connected to, could unwittingly exploit the vulnerable interface and thereby compromise the computing device.

Thus, there exists a need in the art for more advanced approaches, devices and systems for protecting computing devices.

SUMMARY

Various embodiments provide systems and methods for providing intermediary threat detection. In some cases, the intermediary threat detection is performed by a communication control port that operatively couples with a portable computing device to protect the portable computing device from network based vulnerabilities and exploits.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1:
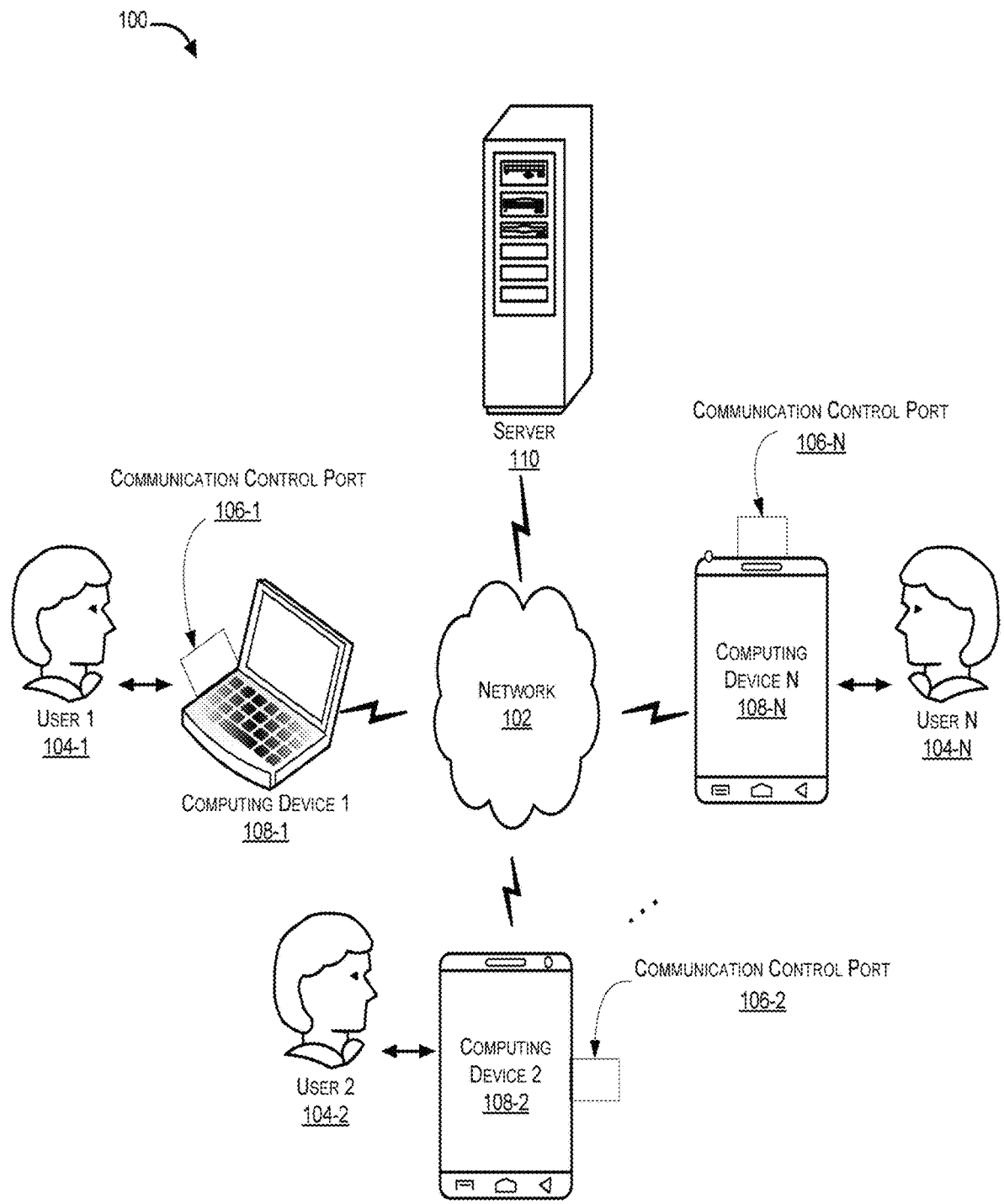
FIG. 1 shows a network environment including a number of computer devices each operatively coupled to a respective communication control port in accordance with some embodiments.

Various embodiments provide systems and methods for providing intermediary threat detection. In some cases, the intermediary threat detection is performed by a communication control port that operatively couples with a portable computing device to protect the portable computing device from network based vulnerabilities and exploits.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods that include: configuring, by a computing device, a communication control port coupled with the computing device through a wired interface, where the communication control port includes at least a first wireless communication circuit; disabling, by the computing device, at least a second wireless communication circuit of the computing device where the second wireless communication circuit performs a function similar to that of the first wireless communication circuit; and establishing, by the computing device, a proxy network connection to route network traffic between an external network and the computing device via the first wireless communication circuit to enable secure communication between the computing device and the external network. The first wireless communication circuit includes at least a first component, and the second wireless communication circuit includes at least a second component.

In some instances of the aforementioned embodiments, the methods further include: performing a threat detection, by the communication control port, on the network traffic between the eternal network and the computing device; and removing, by the communication control port, at least one threat from a subset of the network traffic prior to transferring the modified network traffic to the computing device via the wired interface. In some cases where the aforementioned threat detection is a first threat detection, the methods further include: performing a second threat detection, by the computing device, on the modified network traffic; and removing, by the computing device, at least one threat from a subset of the modified network traffic.

In various instances of the aforementioned embodiments, the first wireless communication circuit is configured to communicate via a Bluetooth™ communication protocol, a WiFi communication protocol, a near-field communication protocol, or a GSM communication protocol. In some instances of the aforementioned embodiments, the communication control port further includes one or more wired communication interfaces configured to connect respective external devices to the computing device. In some cases, at least one of the wired communication interfaces is a thunderbolt port, a universal serial bus (USB) port, a high definition multimedia interface (HDMI) port, an Ethernet port, a secure digital (SD) port, a micro secure digital (microSD) port, a digital video interface (DVI) port, and a video graphic array (VGA) port.

In some instances of the aforementioned embodiments, the wired interface is a charging interface of the computing device. In some cases, the communication control port includes an external battery accessible to the computing device via the wired interface.

Some embodiments provide a communication control device including: a processor, a physical interface; at least one wireless communication circuit that provides at least a first wireless capability, and a computer readable medium. The computer readable medium includes non-transitory instructions executable by the processor to: report the first wireless communication capability to a computing device via the physical interface; enable the first wireless communication capability in response to a request from the computing device to make the first wireless communication capability a proxy for a second wireless communication capability on the computing device; receive input data via the at least one communication circuit; perform a threat detection on the input data, where at least one threat is detected and mitigated to yield an output data; and transfer the output data to the computing device via the physical interface.

In some instances of the aforementioned embodiments, the physical interface is configured for wired attachment to a power interface of the computing device. In various instances of the aforementioned embodiments, the at least one wireless communication circuit is configured to communicate via at least one wireless communication protocol selected from: a Bluetooth™ communication protocol, a WiFi communication protocol, a near-field communication protocol, and/or a GSM communication protocol.

In some instances of the aforementioned embodiments where the input data is a first input data and the output data is a first output data, where the at least one wireless communication circuit further provides a third wireless communication capability, the computer readable medium further includes non-transitory instructions executable by the processor to: report the third wireless communication capability to the computing device via the physical interface; enable the third wireless communication capability in response to the request from the computing device to make the third wireless communication capability a proxy for a fourth wireless communication capability on the computing device; receive second input data via the at least one communication circuit in accordance with the third wireless communication capability; perform a threat detection on the second input data, wherein at least one threat is detected and mitigated to yield a second output data; and transfer the second output data to the computing device via the physical interface.

Yet other embodiments provide a non-transitory computer-readable storage medium embodying a set of instructions, which when executed by one or more processing resources of a computing device, causes the one or more processing resources to perform a method including: configuring a communication control port coupled with the computing device through a wired interface, wherein the communication control port includes at least a first wireless communication circuit; disabling at least a second wireless communication circuit of the computing device, wherein the second wireless communication circuit performs a comparable function to the first wireless communication circuit; and establishing a proxy network connection to route network traffic between an external network and the computing device via the first wireless communication circuit to enable secure communication between the computing device and the external network.

Turning to FIG. 1, a network environment 100 is shown that includes a number of computing devices 108 each operatively coupled to a respective communication control port 106 in accordance with some embodiments. A user 104-1 is shown using a computing device 108-1 (in this case a laptop computer) to access a network 102. Access to network 102 by computing device 108-1 is achieved via a communication control port 106-1 that is operatively coupled to computing device 108-1. A user 104-2 is shown using a computing device 108-2 (in this case a mobile phone) to access network 102. Access to network 102 by computing device 108-2 is achieved via a communication control port 106-2 that is operatively coupled to computing device 108-2. A user 104-N is shown using a computing device 108-N (in this case another mobile phone) to access network 102. Access to network 102 by computing device 108-N is achieved via a communication control port 106-N that is operatively coupled to computing device 108-N.

Computing devices 108 may be any device known in the art that includes a processor, a computer readable medium, and instructions executable by the processor. Thus, computing devices 108 may be, but are not limited to, mobile phones, laptop computers, desktop computers, tablets, smart watches, and handheld gaming consoles. Based upon the disclosure provided herein, one of ordinary skill in the art will recognize a variety of computing devices that may be used in relation to different embodiments. In some cases, the aforementioned computing devices include one or more wireless communication circuits that allow for communication via a network 102 without a physically wired connection to the computing device. Such wireless communication circuits may include, but are not limited to, Bluetooth™ circuits, WiFi circuits, global system for mobile communications (GSM) circuits, and near field communication circuits. Based upon the disclosure provided herein, one of ordinary skill in the art will recognize a variety of wireless communication circuits that may be included in computing devices used in relation to different embodiments.

It is noted that while three computing devices 108 are shown each operatively coupled to a respective communication control port 106, that more or fewer computing devices may be communicatively coupled via network 102 and included in network environment 100. Additionally, that many computing devices included in network environment 100 may not be operatively coupled to a communication control port, but rather may access network 102 directly by way of either wired or wireless circuits implemented on the particular computing device. Further, it is noted that more or fewer servers than the single server 110 that is shown may be included in network environment 100.

Figure 2:
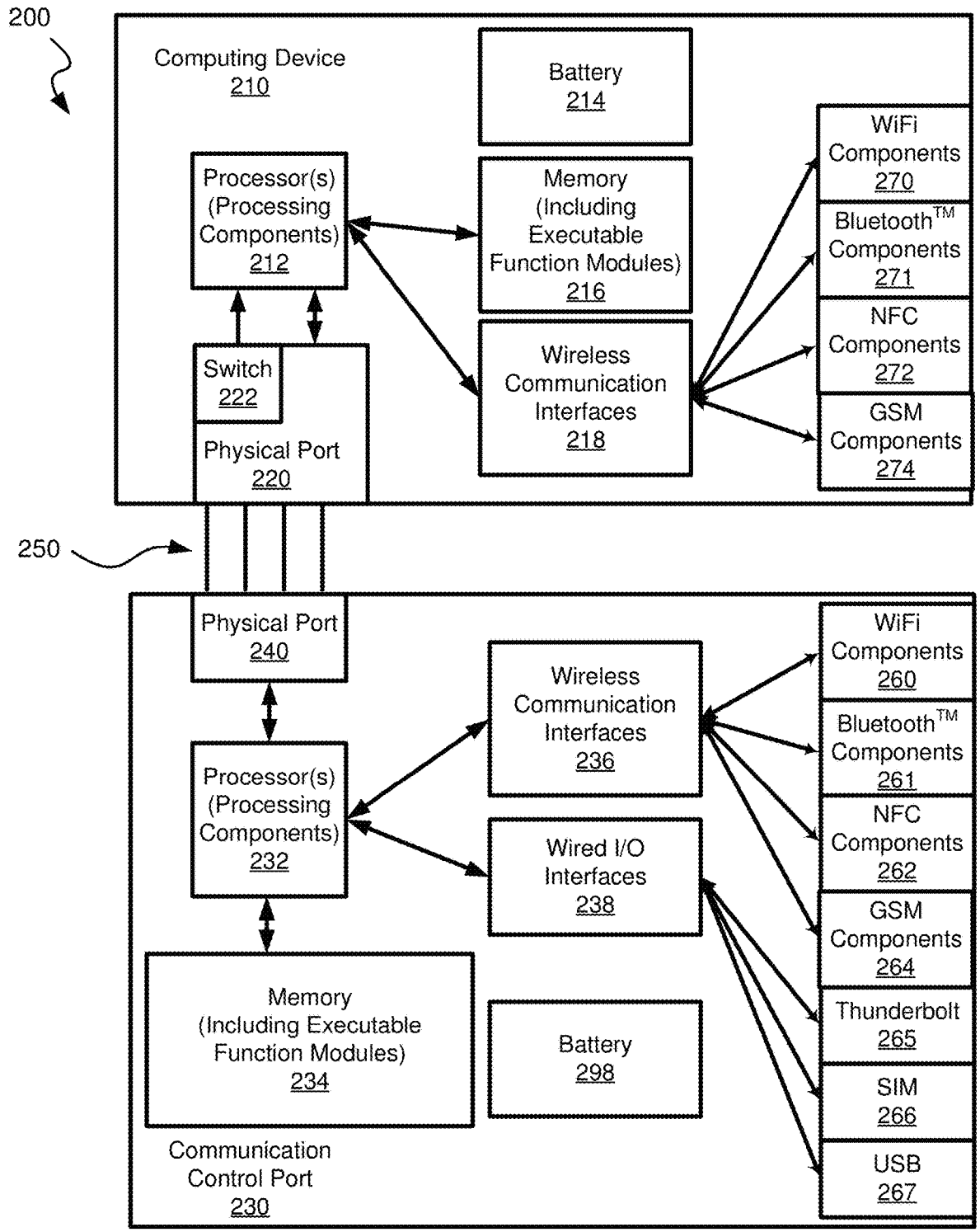
FIG. 2 is a block diagram illustrating a combination of a computing device operatively coupled to a communication control port in accordance with various embodiments.

Turning to FIG. 2, a block diagram 200 shows a combination of a computing device 210 and communication control port 230 in accordance with various embodiments. Computing device 210 includes a processor 212 that is communicably coupled to a memory 216 and one or more wireless communication interfaces 218. Processor 212 may be a single processor, multiple processor or processing components. Memory 216 may include one or more executable functions modules that are comprised of instructions executable by processor 212 to perform a particular function.

Wireless communication interfaces 218 includes one or more components each configured to perform a particular type of wireless communications. Such components may include, but are not limited to, processors and memory including instructions executable to perform the particular function, or custom hardware (e.g., one or more custom Application-Specific Integrated Circuits (ASICs)) designed to perform the particular function. Based upon the disclosure provided herein, one of ordinary skill in the art will recognize a variety of implementations of wireless components that may be used in relation to different embodiments.

In particular, computing device 210 includes: WiFi components 270 capable of performing wireless local area network communications as are known in the art, Bluetooth™ components 271 capable of performing Bluetooth protocol communications as are known in the art, near field communication components 272 capable of performing NFC protocol communications as are known in the art, and global system for mobiles (GSM) components 274 capable of performing cellular telephone communications as are known in the art. It is noted that in different embodiments, more or fewer of the types of wireless communication interfaces 218 may be implemented and that one of ordinary skill in the art will recognize a variety of other types of wireless communication interfaces that may be included.

Computing device 210 further includes a physical port 220 that includes one or more pins configured to electrically couple to a wire connector 250 or directly to pins on a mated device such as, for example, communication control port 230. Physical port 220 includes a switch 222 that is configured to detect a connection with communication control port 230 and to provide an indication of connection/disconnection to processor 212. In some embodiments, physical port 220 includes charging pins of computing device 210. In various embodiments, switch 222 is replaced by a built-in daemon service running on processor 212 of computing device 210. Such a built in daemon service operates to detect connection of computing device 210 to communication control port 230. In other embodiments, both switch 222 and the aforementioned built-in daemon service are used. In addition, computing device 210 includes a battery 214 that in some cases allows for mobility.

Communication control port 230 includes a processor 232 that is communicably coupled to a memory 234, one or more wireless communication interfaces 236, and one or more wired I/O interfaces 238. Processor 232 may be a single processor, multiple processor or processing components. Memory 234 may include one or more executable functions modules that are comprised of instructions executable by processor 232 to perform a particular function.

Wireless communication interfaces 236 includes one or more components each configured to perform a particular type of wireless communications. Similar to that discussed above, such components may include, but are not limited to, processors and memory including instructions executable to perform the particular function, or custom hardware (e.g., one or more custom Application-Specific Integrated Circuits (ASICs)) designed to perform the particular function. Based upon the disclosure provided herein, one of ordinary skill in the art will recognize a variety of implementations of wireless components that may be used in relation to different embodiments.

In particular, communication control port 230 includes: WiFi components 260 capable of performing wireless local area network communications as are known in the art, Bluetooth™ components 261 capable of performing Bluetooth protocol communications as are known in the art, near field communication components 262 capable of performing NFC protocol communications as are known in the art, and global system for mobiles (GSM) components 264 capable of performing cellular telephone communications as are known in the art. It is noted that in different embodiments, more or fewer of the types of wireless communication interfaces 236 may be implemented and that one of ordinary skill in the art will recognize a variety of other types of wireless communication interfaces that may be included.

Communication control port 230 includes: a thunderbolt interface 265, a SIM interface 266, and a USB interface 267. It is noted that in different embodiments, more or fewer of the types of I/O interfaces 236 may be implemented and that one of ordinary skill in the art will recognize a variety of other types of wireless communication interfaces that may be included.

Communication control port 230 further includes a physical port 240 that includes one or more pins configured to electrically couple to a wire connector 250 or directly to pins on a mated device such as, for example, computing device 210. In addition, communication control port 230 includes a battery 298 that can be used to charge battery 214 of computing device 210 when communication control port 230 is connected.

In operation, processor 212 of computing device 210 detects the status of switch 222 to determine whether communication control port 230 is electrically connected via physical ports 220, 240. Where communication control port 230 is not electrically connected to computing device 210, wireless communications are carried out using the wireless communication capabilities of wireless interface(s) 218. This may include one or more of WiFi communications using WiFi components 270, Bluetooth™ communications via Bluetooth™ components 271, NFC communications via NFC components 272, and/or mobile phone communications via GSM components 274. Computing device 210 performs threat detection on the data received from the one or more wireless communication capabilities of computing device 210. Such threat detection and mitigation can be done, for example, by processor 212 computing device 210 executing threat detection and mitigation software stored in memory 216 as a threat detection and mitigation functional module. Any such threat detection and mitigation software known in the art may be used in relation to different embodiments.

Application of such threat detection and mitigation by computing device 210 often has some holes that can be exploited. For example, one or more of Wifi components 270, Bluetooth™ components 271, NFC components 272, or GSM components 274 may exhibit vulnerabilities that can be exploited with the exploitation not being detected by the software threat detection and mitigation software executing on processor 212 of computing device 210. This becomes a particular problem where computing device is sold in high volumes, such a mobile phones, making attempts to expose component vulnerabilities greater and the negative impacts of such exploitation much greater. As another example, where the software in memory 216 is out of date or simply is not configured to detect the particular threat being received, the threat may be missed. After processing the received data for threats, any data that is cleared of threats is utilize as intended by the computing device 210 and the one or more executable function modules maintained in memory 216.

Alternatively, where processor 212 of computing device 210 detects an electrical connection between communication control port 230 and computing device 210, software executing on processor 212 of computing device 210 determines the wireless communication capabilities (e.g., WiFi, NFC, Bluetooth™, and/or GSM) of both computing device 210 and communication control port 230. This can include identification of only wireless communication capabilities that are currently in active use by computing device 210 or may include all wireless communication capabilities of computing device 210 regardless of current activity status. Identification of the wireless communication capabilities of communication control port 230 may be done automatically by processor 232 of communication control port 230 pushing the information to the computing device upon connection via physical ports 220, 240, or may be done by processor 232 of communication control port 230 only after receiving a request from processor 212 of computing device 210 for the information. Any processes known in the art for identifying capabilities of devices may be used.

Processor 212 of computing device 210 maps the wireless communication capabilities identified on communication control port 230 are mapped to corresponding capabilities on computing device 210. For example, processor 212 may map: Wifi Components 260 to WiFi components 270; Bluetooth™ Components 261 to Bluetooth™ components 271; NFC Components 262 to NFC components 272; and/or GSM Components 264 to GSM components 274. This mapping may be maintained in memory 216.

Computing device 210 redirects any wireless communications previously performed by a mapped wireless communication capability on computing device 210 to the corresponding wireless communication capability on communication control port 230. Thus, for example, where WiFi components 270 on computing device 210 are mapped to WiFi components 260 on communication control port 230, WiFi communications are redirected to WiFi components 260 on communication control port 230. The same would be true of all corresponding wireless communication capabilities (e.g., NFC, Bluetooth™, GSM, WiFi). In addition, the wireless communication capability on computing device 210 that was replaced by the corresponding wireless communication capability on communication control port 230 is disabled on computing device 210. Once this is complete, any data previously being transferred via the mapped wireless communication capability on computing device 210 is now sent by transferring the data from computing device 210 to communication control port 230 via physical ports 220, 240, where the data is transmitted using the corresponding wireless communication capability of communication control port 230. Similarly, any data previously being received via the mapped wireless communication capability on computing device 210 is now received by the corresponding wireless communication capability on communication control port 230, processed by processor 232 of communication control port 230, and then the processed data is provided by processor 232 of communication control port 230 to computing device 210 via physical interfaces 220, 240. As such, communication control port 230 becomes a intermediary in the sending and reception of all data sent/received via one or more wireless communication capabilities on communication control port 230 that have been mapped to corresponding wireless communication capabilities on computing device 210.

Processor 232 of communication control port 230 performs threat detection and mitigation on the data received via its wireless communication interfaces 236. Such threat detection and mitigation can be done, for example, by processor 232 of communication control port 230 executing threat detection and mitigation software. Any such threat detection and mitigation software known in the art may be used in relation to different embodiments.

In some embodiments, the threat detection and mitigation performed by communication control port 230 is different from that performed by computing device 210. By using two different threat detection and mitigation approaches, the possibility for missing a threat is reduced. The difference in the threat detection and mitigation may be: that communication control port 230 uses different software than that used on computing device 210, and/or that the threat signatures on one of communication control port 230 or computing device 210 are not updated.

Further, as wireless communication components 260, 261, 262, 264 on communication control port 230 may be different than the corresponding wireless communication components 270, 271, 272, 274 on computing device 210. This can be important where communication control port 230 is a relatively low volume product in comparison to the sales volumes of computing device 210, and thus less likely to be attacked in a broad based attack. As a particular example, a given type of mobile phone (an example of computing device 210) may have sales in the hundreds of millions and communication control port 230 may have sales in the millions. In such a case, a broad based attack may seek to exploit vulnerabilities of wireless communication components 270, 271, 272, 274 of the mobile phone because of the broad impact that can be achieved, but may neglect attacking wireless communication components 260, 261, 262, 264 of communication control port 230 because of the relatively smaller impact exploiting such vulnerabilities would achieve.

Once any data received via the wireless communication control capabilities of communication control port 230 has been processed for threats, the remaining non-threatening data is transferred from processor 232 of communication control port 230 to processor 212 of computing device 210 via physical ports 220, 240. Once received, processor 212 of computing device 210 performs threat detection and mitigation on the data received from communication control port 230. As described above, such threat detection and mitigation can be done, for example, by processor 212 of computing device 210 executing threat detection and mitigation software maintained in memory 216. Any such threat detection and mitigation software known in the art may be used in relation to different embodiments. Again, in some embodiments, the threat detection and mitigation performed previously by communication control port 230 may be different from that now performed by the computing device. By using two different threat detection and mitigation approaches, the possibility for missing a threat is reduced. Ultimately, any data that is cleared of threats is utilize as intended by computing device 210.

Figure 3A:
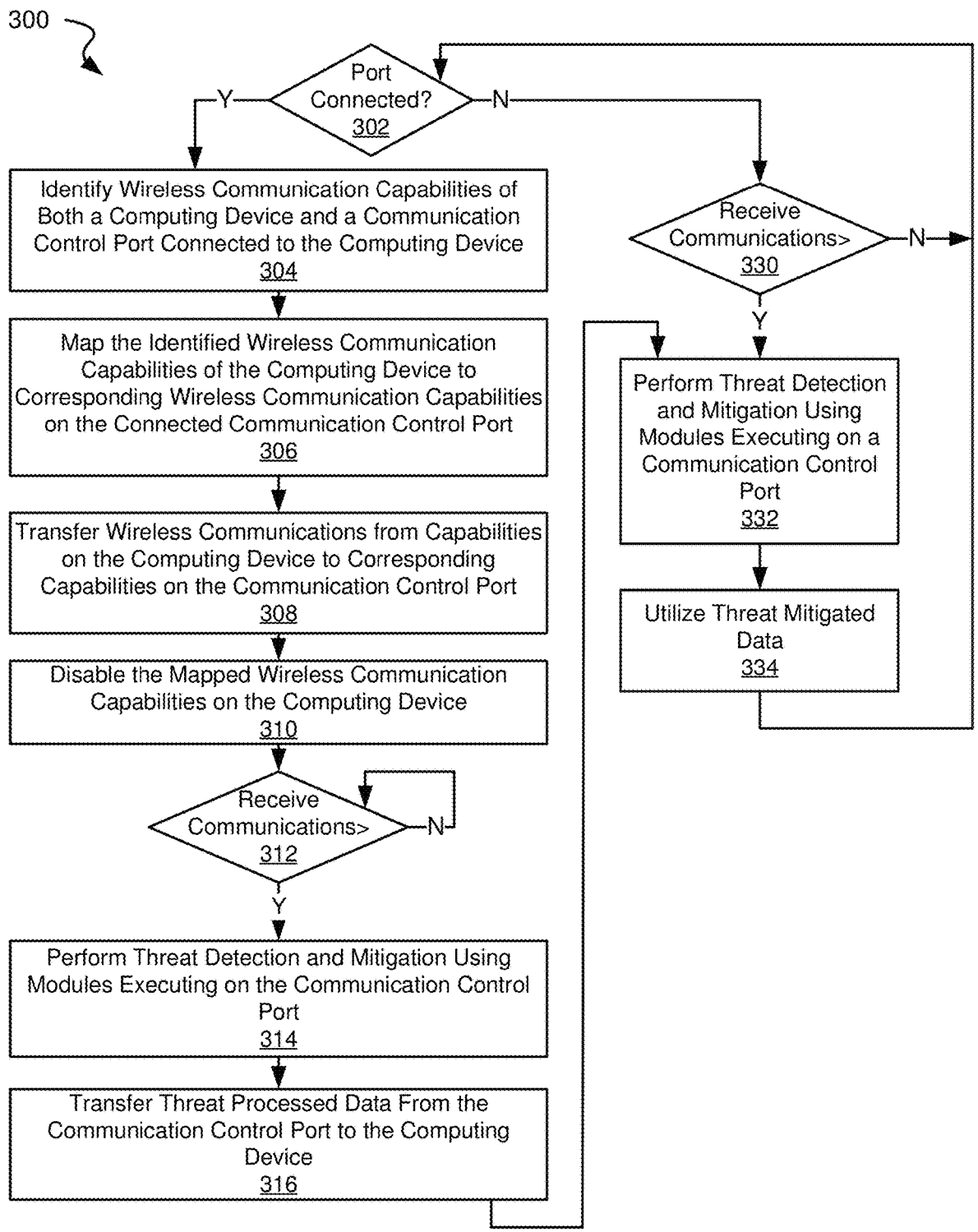
FIGS. 3A-3B is a flow diagram showing a method in accordance with some embodiments for providing threat detection and mitigation to a computing device operatively coupled to a communication control port.

Turning to FIG. 3A, a flow diagram 300 shows a process in accordance with some embodiments for transferring capabilities from a computing device to a communication control port. Following flow diagram 300, it is determined if the computing device is connected to a communication control port (block 302). This determination may be made via a physical switch included as part of a port of the computing device that indicates when a connection is made, and/or by a built-in daemon service running on the computing device that is configured to detect connection of the computing device with a communication control port. Based upon the disclosure provided herein, one of ordinary skill in the art will recognize a variety of approaches that may be used in relation to different embodiments to detect a connection of the computing device to a communication control port.

Where the computing device is connected to a communication control port (block 302), wireless communication capabilities of both the computing device and the communication control port are identified (block 304). Such wireless communication capabilities may include, but are not limited to, Bluetooth™ communication capabilities, WiFi communication capabilities, near-field communication capabilities, and/or GSM communication capabilities. Based upon the disclosure provided herein, one of ordinary skill in the art will recognize a variety of communication capabilities that may be supported by one or both of the computing device and the communication control port.

The identified wireless communication capabilities of the computing device are mapped to corresponding wireless communication capabilities on the connected communication control port (block 306). This may include, for example, mapping Wifi communication capabilities of the computing device to WiFi communication capabilities of the connected communication control port; mapping Bluetooth™ communication capabilities of the computing device to Bluetooth™ communication capabilities of the connected communication control port; mapping NFC communication capabilities of the computing device to NFC communication capabilities of the connected communication control port; and/or mapping GSM communication capabilities of the computing device to GSM communication capabilities of the connected communication control port. This mapping may be maintained in a memory of the computing device.

With the wireless communication capabilities mapped (block 306), the wireless communication capabilities of the computing device are transferred to the corresponding wireless communication capabilities of the communication control port (block 308). As such, the computing device redirects any wireless communications previously performed by a mapped wireless communication capability on the computing device to the corresponding wireless communication capability on the communication control port. Thus, for example, where WiFi communication capabilities on the computing device are mapped to WiFi communication capabilities on the communication control port, all WiFi communications are redirected to WiFi components on the communication control port. The same would be true of all corresponding wireless communication capabilities (e.g., NFC, Bluetooth™, GSM, WiFi). In addition, the wireless communication capability on the computing device that was replaced by the corresponding wireless communication capability on the communication control port is disabled on the computing device (block 310).

Where communications are received (block 312), a processor of the communication control port performs threat detection and mitigation on the data received via its wireless communication capabilities (block 314). Such threat detection and mitigation can be done, for example, by the processor of the communication control port executing threat detection and mitigation software. Any such threat detection and mitigation software known in the art may be used in relation to different embodiments. In some embodiments, the threat detection and mitigation performed by the communication control port is different from that performed by the computing device. By using two different threat detection and mitigation approaches, the possibility for missing a threat is reduced. The difference in the threat detection and mitigation may be: that the communication control port uses different software than that used on the computing device, and/or that the threat signatures on one of the communication control port or the computing device are not updated.

Once any data received via the wireless communication control capabilities of communication control port has been processed for threats (block 314), the remaining non-threatening data is transferred from the communication control port to the computing device (block 316). Once received (block 316), a processor of the computing device performs threat detection and mitigation on the data received from the communication control port (block 332). As described above, such threat detection and mitigation can be done, for example, by the processor of the computing device executing threat detection and mitigation software. Any such threat detection and mitigation software known in the art may be used in relation to different embodiments. Again, in some embodiments, the threat detection and mitigation performed previously by the communication control port may be different from that now performed by the computing device. By using two different threat detection and mitigation approaches, the possibility for missing a threat is reduced. Ultimately, any data that is cleared of threats is utilize as intended by the computing device (block 334).

Alternatively, where it is determined that the computing device is not connected to a communication control port (block 302), data is received directly by the computing device (block 330). Once received (block 330), a processor of the computing device performs threat detection and mitigation on the data received from the communication control port (block 332). As described above, such threat detection and mitigation can be done, for example, by the processor of the computing device executing threat detection and mitigation software. Any such threat detection and mitigation software known in the art may be used in relation to different embodiments. Ultimately, any data that is cleared of threats is utilize as intended by the computing device (block 334).

Figure 3B:
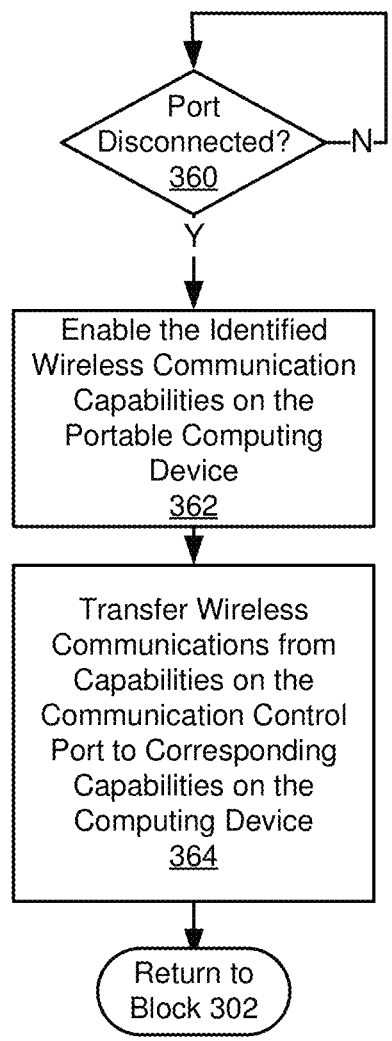

Additionally, as shown in FIG. 3B, at any point if it is detected that the communication control port has been disconnected from the computing device (block 360), the wireless communication capabilities previously identified by the computing device and transferred to the communication control port are re-enabled on the computing device (block 362). In addition, the computing device transfers wireless communication capabilities back from the communication control device to corresponding communication control capabilities on the computing device (block 364). As such all wireless communications are handled directly by the computing device without the aid of the communication control port. Upon completing the disconnect processes (blocks 360-364), processing is returned to block 302 of FIG. 3A.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method, the method comprising:
    configuring, by a computing device, a communication control device coupled with the computing device through a wired interface of the computing device and a first wired communication interface of the communication control device, wherein the communication control device further includes at least a first wireless communication circuit and a processor;
    disabling, by the computing device, at least a second wireless communication circuit of the computing device, wherein the second wireless communication circuit performs a comparable function to the first wireless communication circuit, wherein the comparable function comprises wireless communications via at least one wireless communication protocol; and
    establishing, by the computing device, a proxy network connection to route network traffic between an external network and the computing device via the first wireless communication circuit to enable secure communication between the computing device and the external network.

2. The method of claim 1, the method further comprising:
    performing a threat detection, by the communication control device, on the network traffic between the eternal network and the computing device; and
    removing, by the communication control port, at least one threat from a subset of the network traffic prior to transferring the modified network traffic to the computing device via the wired interface.

3. The method of claim 2, wherein the threat detection is a first threat detection, the method further comprising:
    performing a second threat detection, by the computing device, on the modified network traffic; and
    removing, by the computing device, at least one threat from a subset of the modified network traffic.

4. The method of claim 1, wherein the first wireless communication circuit is configured to communicate via a wireless communication protocol selected from a group consisting of: a Bluetooth™ communication protocol, a WiFi communication protocol, a near-field communication protocol, and a GSM communication protocol.

5. The method of claim 1, wherein the communication control device includes a plurality of wired communication interfaces, including the first wired communication interface, and wherein at least one of the at least one of the plurality of wired communication interfaces is selected from a group consisting of: a thunderbolt port, a universal serial bus (USB) port, a high definition multimedia interface (HDMI) port, an Ethernet port, a secure digital (SD) port, a micro secure digital (microSD) port, a digital video interface (DVI) port, and a video graphic array (VGA) port.

6. The method of claim 1, wherein the wired interface is a charging interface of the computing device.

7. The method of claim 1, wherein the communication control device includes an external battery accessible to the computing device via the wired interface.

8. A non-transitory computer-readable storage medium embodying a set of instructions, which when executed by one or more processing resources of a computing device, causes the one or more processing resources to perform a method comprising:
configuring a communication control device coupled with the computing device through a wired interface of the computing device and a first wired communication interface of the communication control device, wherein the communication control device further includes at least a first wireless communication circuit;
disabling at least a second wireless communication circuit of the computing device, wherein the second wireless communication circuit performs a comparable function to the first wireless communication circuit, wherein the comparable function comprises wireless communications via at least one wireless communication protocol; and
establishing a proxy network connection to route network traffic between an external network and the computing device via the first wireless communication circuit to enable secure communication between the computing device and the external network.

9. The non-transitory computer readable medium of claim 8, wherein the set of instructions, which when executed by one or more processing resources of a computing device, further causes the one or more processing resources to perform a method comprising:
performing a threat detection on the network traffic between the eternal network and the computing device; and
removing at least one threat from a subset of the network traffic prior to transferring the modified network traffic to the computing device via the wired interface.

10. The non-transitory computer readable medium of claim 9, wherein the set of instructions, which when executed by one or more processing resources of a computing device, further causes the one or more processing resources to perform a method comprising:
performing a second threat detection on the modified network traffic; and
removing, by the computing device, at least one threat from a subset of the modified network traffic.

11. The non-transitory computer readable medium of claim 8, wherein the first wireless communication circuit is configured to communicate via a wireless communication protocol selected from a group consisting of: a Bluetooth™ communication protocol, a WiFi communication protocol, a near-field communication protocol, and a GSM communication protocol.

12. The non-transitory computer readable medium of claim 8, wherein the wired interface is a charging interface of the computing device.

13. The non-transitory computer readable medium of claim 8, wherein the communication control device includes a plurality of wired communication interfaces, including the first wired communication interface, and wherein at least one of the at least one of the plurality of wired communication interfaces is selected from a group consisting of: a thunderbolt port, a universal serial bus (USB) port, a high definition multimedia interface (HDMI) port, an Ethernet port, a secure digital (SD) port, a micro secure digital (microSD) port, a digital video interface (DVI) port, and a video graphic array (VGA) port.

* * * * *